United States Patent [19]

Oldham et al.

[11] Patent Number: 4,657,343
[45] Date of Patent: Apr. 14, 1987

[54] OPTICAL FIBER CABLE AND METHOD OF JOINTING TWO CABLE ELEMENTS

[75] Inventors: Ronald C. Oldham, Chandlers Ford; Stephen R. Jones, St. Mary Bourne, both of England

[73] Assignee: Standard Telephones and Cables, Public Limited Company, London, England

[21] Appl. No.: 539,561

[22] Filed: Oct. 6, 1983

[30] Foreign Application Priority Data

Oct. 6, 1982 [GB] United Kingdom ............... 8228604

[51] Int. Cl.$^4$ ............... G02B 6/44; H02G 3/00; B21D 39/00
[52] U.S. Cl. ............... 350/96.23; 350/96.20; 350/96.21; 350/320; 350/96.22; 174/70 R; 174/70 S; 228/148
[58] Field of Search ............... 350/96.23, 96.20, 96.21, 350/96.22, 320; 174/68 R, 70 R, 70 S; 228/141.1, 142, 143, 144, 145, 146, 147, 148, 149, 150, 151, 152, 153

[56] References Cited

U.S. PATENT DOCUMENTS

| | | | |
|---|---|---|---|
| 4,172,212 | 10/1979 | Heinzer | 350/96.21 X |
| 4,252,405 | 2/1981 | Oldham | 350/96.23 |
| 4,379,614 | 4/1983 | Liertz | 350/96.23 |
| 4,447,120 | 5/1984 | Borsuk | 350/96.23 |
| 4,453,291 | 6/1984 | Fidrych | 24/115 N |
| 4,478,486 | 10/1984 | Fentress et al. | 350/96.20 |
| 4,498,732 | 2/1985 | Campbell et al. | 350/96.20 |
| 4,505,540 | 3/1985 | Furusawa et al. | 350/96.20 |
| 4,545,645 | 10/1985 | Mignien | 350/96.20 |
| 4,585,302 | 4/1986 | Schoen | 350/96.20 |
| 4,595,256 | 6/1986 | Guazzo | 350/96.23 |
| 4,598,290 | 7/1986 | Collins et al. | 340/850 |
| 4,601,536 | 7/1986 | Guazzo | 350/96.23 |
| 4,610,503 | 9/1986 | Miyazaki et al. | 350/96.20 |

FOREIGN PATENT DOCUMENTS

| | | | |
|---|---|---|---|
| 0144829 | 11/1980 | German Democratic Rep. | 350/96.21 |
| 57-78011 | 5/1982 | Japan | 350/96.23 |
| 2115172 | 9/1983 | United Kingdom | 350/96.23 |
| 2116901 | 10/1983 | United Kingdom | 350/96.23 |

*Primary Examiner*—William L. Sikes
*Assistant Examiner*—Brian M. Healy
*Attorney, Agent, or Firm*—Dennis P. Clarke

[57] ABSTRACT

The strength members of the optical fibre cables to be jointed comprise inner and outer layers of high-tensile wires (9, 10; 9', 10') arranged on respective pressure-resistant tubes (5; 5'), each containing an optical fibre package (not shown). The strength members are jointed by trapping the wires between a quill (15) and a ferrule (16) pressed towards the quill. The quill (15) is of a relatively hard steel and serves to partially reinstate the pressure tube between the ends of the cables, whereas the ferrule (16) is of a relatively soft steel. For jointing of two dielectric covered elements the ferrule is subsequently encapsulated in a dielectric moulding (27). A thin-walled reinstatement tube (17) is arranged between the quill (15) and one tube (5'). The cavity in the reinstatement tube (17) is larger in diameter than the cavity in the tubes (5 and 5'). Thus, when the optical fibres are arranged to lie helically in the reinstatement tube without exceeding their minimum allowable bending radius, optical fibre slack can be absorbed in a minimum distance, and any diameter increase over optical fibre joints can be readily accommodated. Pressure tube repairs can be made with such a reinstatement tube (7-FIG. 2) arranged directly between two tubes in cases where there are no wires to join.

22 Claims, 3 Drawing Figures

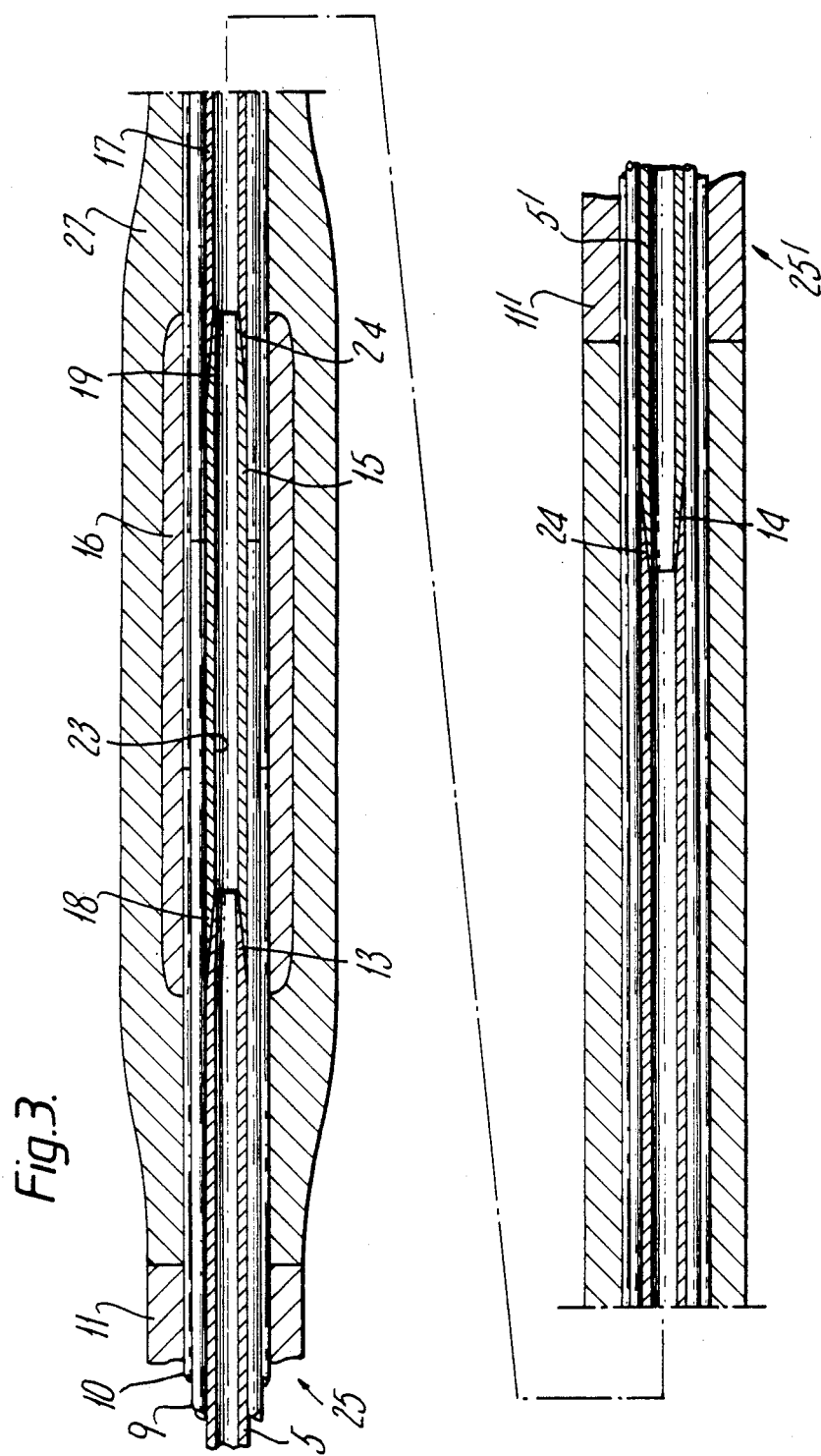

OPTICAL FIBER CABLE AND METHOD OF JOINTING TWO CABLE ELEMENTS

BACKGROUND OF THE INVENTION

This invention relates to optical fibre cables and in particular to the manufacture thereof and to joints between two elements thereof during manufacture or cable/cable joints.

In a design of optical fibre cable which is particularly but not exclusively suitable for submarine use and which is shown in section in FIG. 1 of the accompanying drawings, there is employed a central optical fibre package. The package includes a package strength member 1 made of high tensile steel wire which may if desired be copper plated to improve the electrical conductivity and which is coated with a plastics coating 2. Around the package strength member 1 are eight single mode secondary coated optical fibres 3 which are held in place by a fibre package whipping 4, such as a Kevlar ribbon. The fibre package is loosely housed in tubular member 5, which may be of aluminium and formed by closing an open aluminium "C"-section around the fibre package such that the edges of the "C"-section abut at 8. The tubular member 5 comprises a pressure resistant tube and may be employed for the transmission of electrical power or signals along the length of the cable. The optical fibre package and the annular gap 6 between the package and the inner wall of tubular member 5 may be impregnated and filled, respectively, with a water-blocking compound. Around the core are applied two layers of high tensile strength elements 9 and 10 which are torsionally balanced and applied with opposite lay directions. The outer layer 10 has more wires than the inner layer; the outer layer wires being smaller in diameter than the inner layer wires. For submarine cables there is extruded around the outside of and directly onto outer layer 10 a polyethylene dielectric sheath 11, and one or more armouring layers 12 may be applied over sheath 11.

For the manufacture of very long lengths, in particular of such optical fibre cable it is desirable to be able to joint two cable elements comprising the optical fibre package, the tubular member 5 and the strength member layers 9 and 10 before dielectric extrusion, in such a manner that the joint will subsequently pass through the dielectric extruder without difficulty, so that dielectric which is continuous and presents the same external diameter over all cable elements and joints therebetween may be obtained. Joints between two completed armoured or lightweight (unarmoured) fibre optic submarine cables must also be made in order to provide required cable lengths or mend damaged cables. At all of such joints the pressure resistant tubes 5 must be jointed in such a way that the tube is made effectively continuous over the length of the cable. In addition the strength members must be jointed in such a way that the loads applied to the strength members will be transmitted over the joint without causing damage to the cable members thereunder, in particular without causing stretching of the pressure-resistant tube 5 and subsequent stretching and possible fracture of the optical fibres therein. One known method of achieving jointing of the tube and the strength members is to employ a ferrule arrangement as disclosed, for example, in our U.K. application No. 39146/78, corresponding to U.S. Pat. No. 4,348,076 (R. C. Oldham—14). However, this particular ferrule arrangement, which was developed with an alternative cable construction in mind, is a relatively complex structure and results in a larger diameter over the joint region, with the result that the joint will not readily pass through a dielectric extruder unless it employs a variable-size extruder point as disclosed in our U.K. Application No. 8206374 corresponding to U.K. patent application No. 2,116,901 (M. P. Jones—1).

During the manufacture of optical fibre cable it may also be necessary to repair the tubular member 5 itself before the manufacturing process in which the strength member layers 9 and 10 are applied over it.

SUMMARY OF THE INVENTION

According to the present invention there is provided a method of repairing a cable element or jointing two cable elements, the or each cable element including a pressure resistant tube containing an optical fibre package, comprising the step of reinstating the pressure tube by means of a reinstatement tube with a wall thickness less than but a similar external diameter as, the pressure resistant tube, whereby to provide a cavity at the repair or joint to accommodate optical fibre slack, which cavity is of such dimensions that the optical fibres lie helically therein without exceeding their minimum allowable bending radius.

According to a second aspect of the invention there is provided a method of jointing two cable elements each including a pressure resistant tube containing an optical fibre package, over which tubes are applied strength member wires, comprising the steps of reinstating the pressure tube by means including a reinstatement tube with a wall thickness less than but a similar external diameter as, the pressure resistant tubes, whereby to provide a cavity at the joint to accommodate optical fibre slack, which cavity is of such dimensions that the optical fibres lie helically therein without exceeding their minimum allowable bending radius, and of jointing the strength member wires of the two cable elements.

According to a further aspect of the invention there is provided a method of jointing two cable elements each including a pressure resistant tube containing an optical fibre package, over which tubes are applied strength member wires, comprising the steps of jointing the pressure resistant tubes of the cable elements by means including a quill, arranging a ferrule to extend over the quill and the wires thereon and swaging the ferrule whereby to clamp the wires between the quill and the ferrule, the quill preventing the fibre package from being crushed.

According to yet another aspect of the invention there is provided an optical fibre cable reinstatement in which optical fibres lie helically in a reinstatement cavity without exceeding their minimum allowable bending radius.

BRIEF DESCRIPTION OF THE DRAWINGS

Embodiments of the present invention will now be described with reference to FIGS. 1, 2 and 3 of the accompanying drawings which show sections through two completed joints.

DETAILED DESCRIPTION OF THE PREFERRED EMBODIMENTS

Figure 1:
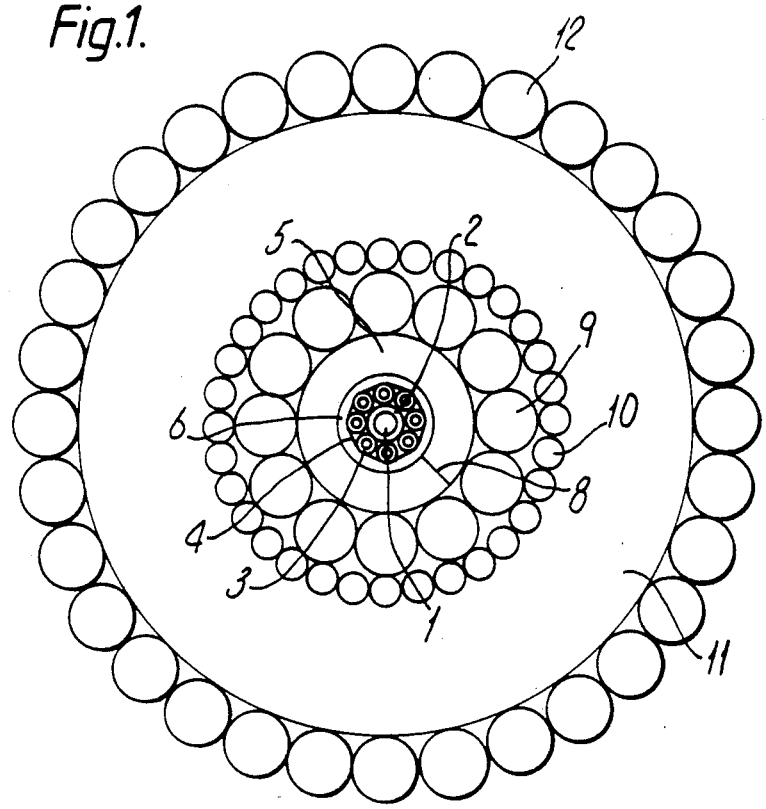
FIG. 1 being an optical fibre cable.
Figure 2:
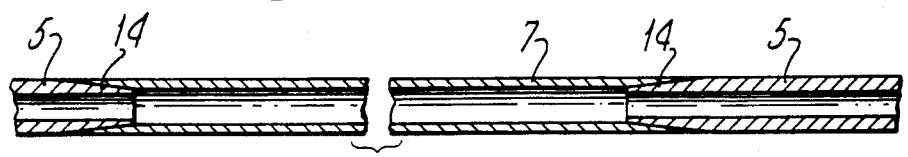
FIG. 2 being of a joint between two tubular members for repair purposes during cable manufacture and FIG. 3 being a of joint made between two completed cables.

The cable elements to be jointed in the FIG. 2 manner each include an optical fibre package (not shown) as described with reference to FIG. 1 which is arranged in a tubular member 5. Such a joint may be required as a repair, during cable manufacture, following closure of the "C"-section around the optical fibre package due, for example, to damage to the "C"-section. A portion of the tubular member may first be removed and depending on whether or not the optical fibre package itself was damaged, the optical fibres are jointed, if necessary, conventionally or otherwise. The ends of both of the tubular members to be joined are provided with a shallow taper 14. A thin walled "C"-sectioned element 7, which is internally tapered at both ends to match the tapers 14, is then closed around the optical fibre package to provide a reinstatement tube, with the same external diameter as the tubular members, which is secured to the tubular members 5 by an adhesive, for example an epoxy resin.

A thin-walled "C"-sectioned element is employed to form the reinstatement tube in order that the cavity provided in the region of the reinstatement tube is larger in cross-section than the cavity in the tubular members themselves. This means that the length of element 7 may be shorter than if a length of an element with the same wall thickness as the tubular members 5 themselves was used to provide a reinstatement tube, since a larger volume is provided in which to accommodate increased fibre diameter due to joints therein and to dispose of any slack optical fibre created as a result of jointing. When splicing packages containing a number of optical fibres one cannot guarantee the exact length of each fibre over the joint, with the result that some fibres will be shorter than others, and thus there will be some excess length which it is desired to dispose of in a cavity with the smallest diameter and length possible. The length of the reinstatement tube is preferably such that the optical fibres are arranged in the cavity thereof in a helical snake-like fashion with the minimum bending radius for the fibres not being exceeded.

Since the reinstatement tube should preferably mechanically match the tubular members it is joining but provide a larger cavity, the reinstatement tube must be of a stronger material than the tubular members themselves. For example, aluminium tubular members 5 with a wall thickness nominally 60 thousandth of an inch may be joined by a copper reinstatement tube 7 of nominal wall thickness 30 thousandth of an inch.

Such a thin-walled reinstatement tube may also be employed in joints to be made between two cable elements during manufacture and after application of the strength member layers 9 and 10 to the tubular members 5, or in joints between two completed submarine cables, for example. The joints between the strength member layers 9 and 10, and any elements applied thereover, being manufactured by any appropriate method.

The joint shown in FIG. 3 is between two dielectric-insulated submarine cables 25 and 25' which may also have external armouring (not shown). One cable end to be jointed, the left-hand end in FIG. 3 is prepared by first unravelling any armour wires (not shown) arranged over the dielectric 11 and holding them clear, suitably shortening the length of dielectric 11, unravelling the wires of layers 9 and 10, and holding them clear, and suitably shortening the tubular member 5 such that a suitable length of the optical fibre package extends therefrom to facilitate jointing. A taper 13 is machined on the end of tubular member 5. The other cable end to be jointed, the right-hand end in FIG. 3, is prepared by similarly unravelling any armouring (not shown); suitably shortening the dielectric 11' and unravelling the elements of strength member layers 9' and 10' over a considerable length and holding them out of the way, removing a corresponding length of the tubular member 5' and machining a taper 14 on the exposed end of the tubular member 5'. A corresponding length of the optical fibre package will then extend from the tubular member 5' to facilitate jointing of the fibre packages. A steel quill 15 and a steel ferrule 16 are slipped over one of the exposed optical fibre packages and on the outer strand layer thereof, respectively, the latter preferably being so slipped over before unravelling of the wire layers 9 and 10, and the cable element ends are secured in a supporting jig (not shown) for the jointing operation. The jig may be such that the tapers 13 and 14 may be spaced by some 12 inches for the jointing of the optical fibres, whilst they may be spaced by some 48 inches for other jointing operations. The overall exposed length of optical fibre packages being of the order of 48 inches in order to provide surplus fibre length to facilitate splicing thereof.

The quill 15 has an internal bore 23 which tapers at one end as at 18 to match the taper machined on the tube 5 and at the other end the quill is externally tapered as at 19. Typically the quill is manufactured from a material which is relatively hard compared with that of the ferrule 16, such as EN24Z steel whereas the ferrule 16 is of a relatively soft material compared with that of the quill 15, such as EN32B steel or EN19T steel.

The use of materials with such hardness values ensures that the ferrule can be pressed sufficiently towards the quill during a ferrule swaging to trap the strength member wires, as described hereinafter, without the quill correspondingly being pressed towards the cable elements thereunder, thus avoiding stretching of the optical fibres. The ferrule 16 initially has an internal diameter such as to permit it to slide over the outer strand layer 10.

The fibre ends of the two cables are then spliced by any conventional or suitable method. When splicing is completed the tube ends are moved apart until the shortest fibre is almost tight. The ends of the package kingwires or strength members 1 are jointed, for example by means of a split brass tube and soldering. Surplus fibre is wrapped around the kingwire in a helical snake-like fashion such that the minimum bending radius for the fibres is not exceeded, that is the fibres are not bent to a radius of curvature less than a predetermined amount, typically 30 mm. The quill 15 is pulled up to adopt a position adjacent the taper 13 of tubular member 5 to which it is then secured with the tapers abutting by an adhesive, such as an epoxy resin. A thin-walled C-sectioned element 17, which is internally tapered at both ends 24, is then closed around the optical fibre package between the quill 15 and the tubular member 5' to provide a reinstatement tube which is secured to the taper 19 of the quill 15 and to the taper 14 of tubular member 5' by an adhesive, for example an epoxy resin. The wires of the strength member inner layers 9 and 9' are then relaid over the tubular member 5 and quill 15, and tubular member 5', closed element 17 and quill 15, respectively; the lengths of the individual wires being adjusted so that the wires of the two cable elements to be jointed abut at a position substantially one-third of the way along the quill 15 as measured from one quill end. The outer layer wires 10 and 10' are relaid over the layers 9 and 9', respectively, and their lengths adjusted so that the wires from the different cables abut at a position substantially two-thirds of the way along the quill as measured from the one quill end. A slurry of carborundum grit is applied to the wire surfaces over the quill and the ferrule 16 is then slid into position over the quill and wires thereon and swaged in order to firmly trap the wires of both the layers 9, 9' and 10, 10' between the ferrule and the quill.

An injection moulding process is employed to reinstate the dielectric between the dielectric 11 and 11', producing polyethylene, for example, insulation 27. In the case of armoured cables the armour wires are relaid over the joint and a barrel or overlay splice, for example, employed to joint the two sets of armour wires together.

The method of jointing described above with reference to FIG. 3 may also be employed to joint two cable elements which are not provided with dielectric over the strength member wires 9 and 10. This may, for example, be required during cable manufacture and before the dielectric extrusion process. In order that the ferrule 16 can pass through the dielectric extruder the variable-size extruder point of Application No. 8206374, corresponding to U.K. patent application No. 2,116,901 may be employed.

The joint described above with reference to FIG. 3 employs a swaging technique to firmly grip the strength member wires and thus ensure that loads applied to either cable are transmitted to the other cable and without causing stretching of the optical fibres. Typically, the percentage swaging lies in the range 3 to 6%, preferably 4%. Since the tubular members 5 are formed of a material, for example aluminium, which is relatively soft so that it can be provided as an open "C"-section element and subsequently closed to form a tube by passage through a die, an outer ferrule cannot simply be swaged down onto strength member wires which are arranged on an aluminium tube since the latter will be deformed by the swaging process and this results in the possibility of stretching and fracture of the optical fibres. Thus at least under the ferrule the tubular member 5 is replaced by the quill which is of a relatively hard material which will be unaffected by the swaging process and thus prevent the fibre package from being crushed. Since it is necessary to remove a fairly considerable length of the tubular member 5' of one cable end in order to provide a sufficient length of the fibre package to enable jointing thereof to be carried out relatively easily, the tubular member must be reinstated subsequently to fibre package jointing, and the quill only extends along a portion of the length requiring such reinstatement. It is not desirable that the quill should extend over the complete length between the two cable ends since the quill is of a relatively hard and thus inflexible material and thus would prevent winding of a jointed cable onto a reel or drum. Therefore the remainder of the length of the removed tubular member is replaced by the application of another length of "C"-sectioned material. As mentioned previously, this other length of "C"-sectioned material is preferably of a thinner walled section in order to provide an increased sized cavity for accommodating slack optical fibre. However, since it is thinner it may be desirable for it to be of a stronger material than that employed for the tubular member 5, for example copper, but it could be of aluminium.

Whereas the reinstatement tube 7 or 17 has been described above as formed from a thin-walled "C"-section element, it may alternatively be comprised by a pair of semi-circular section shells, which are also thin-walled in order to provide an increased capacity cavity.

We claim:

1. A method of repairing a cable element or jointing two cable elements, the or each cable element including throughout its length a pressure resistant tube having an internal diameter and an external diameter and containing an optical fibre package, comprising the step of providing in place of the pressure resistant tube at the repair or joint, a reinstatement tube with a greater internal diameter than but substantially the same external diameter as the pressure resistant tube, whereby said greater internal diameter of said reinstatement tube provides a cavity at the repair or joint to accommodate optical fibre slack, which cavity is of such dimensions that optical fibres lie helically therein without exceeding their minimum allowable bending radius.

2. A method of joining two cable elements each including a pressure resistant tube having an internal diameter and an external diameter and containing an optical fibre package, over which tubes are applied strength member wires, comprising the steps of: (1) providing, in place of the pressure resistant tube at the joint, a reinstatement tube with a greater internal diameter therein but substantially the same external diameter as the pressure resistant tubes whereby said greater internal diameter of the reinstatement tube provides a cavity at the joint to accommodate optical fibre slack, which cavity is of such dimensions that optical fibres lie helically therein without exceeding their minimum allowable bending radius and (2) of joining the strength member wires of the two cable elements.

3. A method as claimed in claim 1 or claim 2, wherein the pressure resistant tubes comprise closed "C"-section elements.

4. A method as claimed in claim 1 or claim 2, wherein the reinstatement tube is formed by closing a "C"-section member around the optical fibres between the two pressure resistant tubes.

5. A method as claimed in claim 1 or claim 2, wherein the reinstatement tube comprises a pair of semi-circular section shells.

6. A method as claimed in claim 1 or claim 2 wherein the pressure resistant tubes are comprised of aluminium and the reinstatement tube is comprised of copper.

7. A method as claimed in claim 1 or claim 2, wherein the pressure resistant tubes are externally tapered towards their ends, and wherein the reinstatement tube is correspondingly internally tapered at its ends and secured to the pressure resistant tubes with the tapers overlapping by means of an epoxy resin adhesive.

8. A method of jointing two cable elements each including a pressure resistant tube containing an optical fibre package, over which tubes are applied strength member wires, comprising the steps of jointing the pressure resistant tubes of the cable elements by means including a quill said means having an external diameter substantially the same as said pressure resistant tubes arranging a ferrule to extend over the quill and the wires thereon and swaging the ferrule whereby to clamp the wires between the quill and the ferrule, the quill preventing the fibre package from being crushed.

9. A method as claimed in claim 8, including the steps of securing one end of the quill to the pressure-resistant tube of one cable element and securing the other end of the quill to one end of a reinstatement pressure-resistant tube the other end of which is secured to the pressure resistant tube of the other cable element.

10. A method as claimed in claim 8, wherein the percentage swaging lies in the range 3 to 6%.

11. A method as claimed in claim 8, wherein the wires of the two cable elements abut at different positions on the quill.

12. A method as claimed in claim 8, wherein the cable elements include dielectric surrounding the outer layer of wires, and further including the step of providing a reinstatement moulding of dielectric to extend over the swaged ferrule and between the dielectric on the two cable elements.

13. A method as claimed in claim 12, wherein the cable elements include armouring provided over the dielectric.

14. A method as claimed in claim 9, wherein the quill is secured to the respective pressure resistant tube and the reinstatement tube is secured to the quill and the respective pressure resistant tube by an epoxy resin adhesive.

15. A method as claimed in claim 9, wherein one end of the quill is internally tapered, and wherein the pressure resistant tube to which said one quill end is to be secured is correspondingly externally tapered.

16. A method as claimed in claim 15, wherein the other end of the quill is provided with an external taper and one end of the reinstatement tube is correspondingly internally tapered.

17. A method as claimed in claim 15, wherein the other end of the reinstatement tube is internally tapered and wherein the pressure-resistant tube to which it is to be secured is correspondingly externally tapered.

18. A method as claimed in claim 9, including the step of jointing the optical fibre packages of the two cable elements, and wherein the reinstatement tube is formed by closing a "C"-sectioned member around the jointed optical fibre package.

19. A method as claimed in claim 9, including the step of jointing the optical fibre packages of the two cable elements, and wherein the reinstatement tube comprises a pair of semicircular section shells.

20. A method as claimed in claim 8, wherein the quill material is of a material which is hard relative to the ferrule material.

21. A method as claimed in claim 20, wherein the quill comprises EN24Z steel and the ferrule comprises EN32B steel or EN19T steel.

22. An optical fibre cable reinstatement in which optical fibres lie helically in a reinstatement cavity without exceeding their minimum allowable bending radius, said reinstatement cavity being provided in a tubular member whose external diameter conforms with that of a tubular member of the cable in which the optical fibres are arranged and whose internal diameter is larger than that of the tubular member whereby optical fibre slack is accommodated in a reinstatement of minimum length.

* * * * *